United States Patent
Cui et al.

(10) Patent No.: US 12,069,716 B2
(45) Date of Patent: Aug. 20, 2024

(54) PHYSICAL UPLINK CONTROL CHANNEL SECONDARY CELL ACTIVATION IN NEW RADIO

(71) Applicant: APPLE INC., Cupertino, CA (US)

(72) Inventors: Jie Cui, Cupertino, CA (US); Qiming Li, Beijing (CN); Yang Tang, Cupertino, CA (US); Manasa Raghavan, Cupertino, CA (US); Xiang Chen, Cupertino, CA (US); Huaning Niu, Cupertino, CA (US); Dawei Zhang, Cupertino, CA (US); Hong He, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 405 days.

(21) Appl. No.: 17/593,183

(22) PCT Filed: Jan. 15, 2021

(86) PCT No.: PCT/CN2021/072216
§ 371 (c)(1),
(2) Date: Sep. 10, 2021

(87) PCT Pub. No.: WO2022/151372
PCT Pub. Date: Jul. 21, 2022

(65) Prior Publication Data
US 2023/0180285 A1   Jun. 8, 2023

(51) Int. Cl.
*H04W 74/00* (2009.01)
*H04L 5/00* (2006.01)
(Continued)

(52) U.S. Cl.
CPC ......... *H04W 74/002* (2013.01); *H04L 5/0094* (2013.01); *H04W 56/0045* (2013.01); *H04W 74/0833* (2013.01)

(58) Field of Classification Search
CPC ........... H04W 74/002; H04W 56/0045; H04W 74/0833; H04L 5/0094; H04L 5/0032; H04L 5/0053
See application file for complete search history.

(56) References Cited

U.S. PATENT DOCUMENTS

2018/0049186 A1   2/2018  Hong et al.
2019/0305918 A1*  10/2019 Siomina ................. H04L 5/001
(Continued)

FOREIGN PATENT DOCUMENTS

CN   102244927 A   11/2016
CN   110831055 A   2/2020
(Continued)

OTHER PUBLICATIONS

3GPP TS 38.321 v16.3.0 (Dec. 2020).*
(Continued)

*Primary Examiner* — Jae Y Lee
(74) *Attorney, Agent, or Firm* — Dorsey & Whitney LLP

(57) ABSTRACT

Provided is a method for a user equipment (UE). The UE obtains a physical uplink control channel (PUCCH) secondary cell (SCell) activation command from a primary cell (PCell) or primary secondary-cell-group cell (PSCell). The PUCCH SCell activation command is used for an PUCCH SCell activation of a target PUCCH SCell for the UE. The UE performs PUCCH SCell activation operations associated with a valid timing advance (TA) and the PUCCH SCell activation command. TA is considered to be a valid TA when the TA meets a preset criterion. The UE generates a channel state information (CSI) report for transmission to at least one of the PCell, PSCell and the target PUCCH SCell. The CSI report indicates that the PUCCH SCell activation is completed.

13 Claims, 12 Drawing Sheets

(51) Int. Cl.
  *H04W 56/00* (2009.01)
  *H04W 74/0833* (2024.01)

(56) References Cited

U.S. PATENT DOCUMENTS

| | | | |
|---|---|---|---|
| 2021/0219346 A1* | 7/2021 | Agiwal | H04W 74/0833 |
| 2021/0282179 A1* | 9/2021 | Lei | H04L 1/1896 |
| 2023/0239126 A1* | 7/2023 | Liu | H04L 5/0048 |
| | | | 370/329 |
| 2023/0361835 A1* | 11/2023 | Shen | H04L 5/0094 |

FOREIGN PATENT DOCUMENTS

| | | |
|---|---|---|
| CN | 112189354 A | 1/2021 |
| WO | 2016053174 A1 | 4/2016 |

OTHER PUBLICATIONS

3GPP TS 38.213 v16.4.0 (Dec. 2020).*
PCT/CN2021/072216, International Search Report and Written Opinion, Oct. 19, 2021, 9 pages.
Samsung, "Activation and deactivation for dual connectivity", R2-141487, 3GPP TSG RAN WG2 #85b, Valencia, Spain, Agenda Item 7.1.4, Mar. 31-Apr. 4, 2014, 4 pages.

\* cited by examiner

PHYSICAL UPLINK CONTROL CHANNEL SECONDARY CELL ACTIVATION IN NEW RADIO

TECHNICAL FIELD

This application relates generally to wireless communication systems, and more specifically to physical uplink control channel (PUCCH) secondary cell (SCell) activation.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that includes: obtaining a physical uplink control channel (PUCCH) secondary cell (SCell) activation command from a primary cell (PCell) or primary secondary-cell-group cell (PSCell), wherein the PUCCH SCell activation command is used for an PUCCH SCell activation of a target PUCCH SCell for the UE; performing PUCCH SCell activation operations associated with a valid timing advance (TA) and the PUCCH SCell activation command, wherein a TA is considered to be a valid TA when the TA meets a preset criterion; and generating a channel state information (CSI) report for transmission to at least one of the PCell, PSCell and the target PUCCH SCell, wherein the CSI report indicates that the PUCCH SCell activation is completed.

According to an aspect of the present disclosure, a method for a network device of a primary cell (PCell) or primary secondary-cell-group cell (PSCell) is provided that includes: generating a physical uplink control channel (PUCCH) secondary cell (SCell) activation command for transmission to a user equipment (UE), wherein the PUCCH SCell activation command is used for a PUCCH SCell activation of a target PUCCH SCell for the UE; obtaining a hybrid automatic repeat request (HARQ) signaling from the UE, wherein the HARQ signaling indicates that the UE has received the PUCCH SCell activation command; and configuring a physical downlink control channel (PDCCH) order for transmission to the UE, wherein the PDCCH order requires the UE to initiate a random access (RA) procedure on the target PUCCH SCell.

According to an aspect of the present disclosure, a method for a network device of secondary cell (SCell) is provided, wherein the SCell is a target PUCCH SCell to be activated for a user equipment (UE), the method including: obtaining a physical random access channel (PRACH) preamble from the UE; and generating a random access response (RAR) including the information associated with a valid Timing Advance (TA) for transmission to the UE, wherein a TA is considered to be a valid TA when the TA meets a preset criterion.

According to an aspect of the present disclosure, an apparatus for a user equipment (UE) is provided that includes one or more processors configured to perform steps of the method according to the present disclosure.

According to an aspect of the present disclosure, an apparatus of a network device for a primary cell (PCell) or primary secondary-cell-group cell (PSCell) is provided that includes one or more processors configured to perform steps of the method according to the present disclosure.

According to an aspect of the present disclosure, an apparatus of a network device for a secondary cell (SCell) is provided that includes one or more processors configured to perform steps of the method according to the present disclosure.

According to an aspect of the present disclosure, a computer readable medium is provided that has computer programs stored thereon, which when executed by one or more processors, cause an apparatus to perform steps of the method according to the present disclosure.

According to an aspect of the present disclosure, an apparatus for a communication device is provided that includes means to perform steps of the method according to the present disclosure.

According to an aspect of the present disclosure, a computer program product is provided that includes computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In order to increase the bandwidth and thus increasing the bitrate, a user equipment (UE) may be connected to more than one serving cell. In New Radio (NR), one serving cell may be designated as a primary cell (PCell) or primary secondary-cell-group cell (PSCell), while some other cells may be secondary cells (SCells). In some cases, a PCell (or PSCell) and SCells for UE may correspond to (supported by) a same base station. In some other cases, PCell (or PSCell) and SCells may correspond to (supported by) different base stations.

A base station may add and remove SCells. After a base station adds SCells for a UE, when there is a need of more data to be delivered to the UE in the downlink (DL), for example, the base station may activate the added SCells. When there is no more need of the added SCells, the added SCells may be deactivated from the activation state.

In some cases, a physical uplink control channel (PUCCH) SCell activation may be involved. During the PUCCH SCell activation, sometimes there is a valid TA for the UE, but sometimes there is not a valid TA (for example, invalid TA or no TA).

Figure 1:
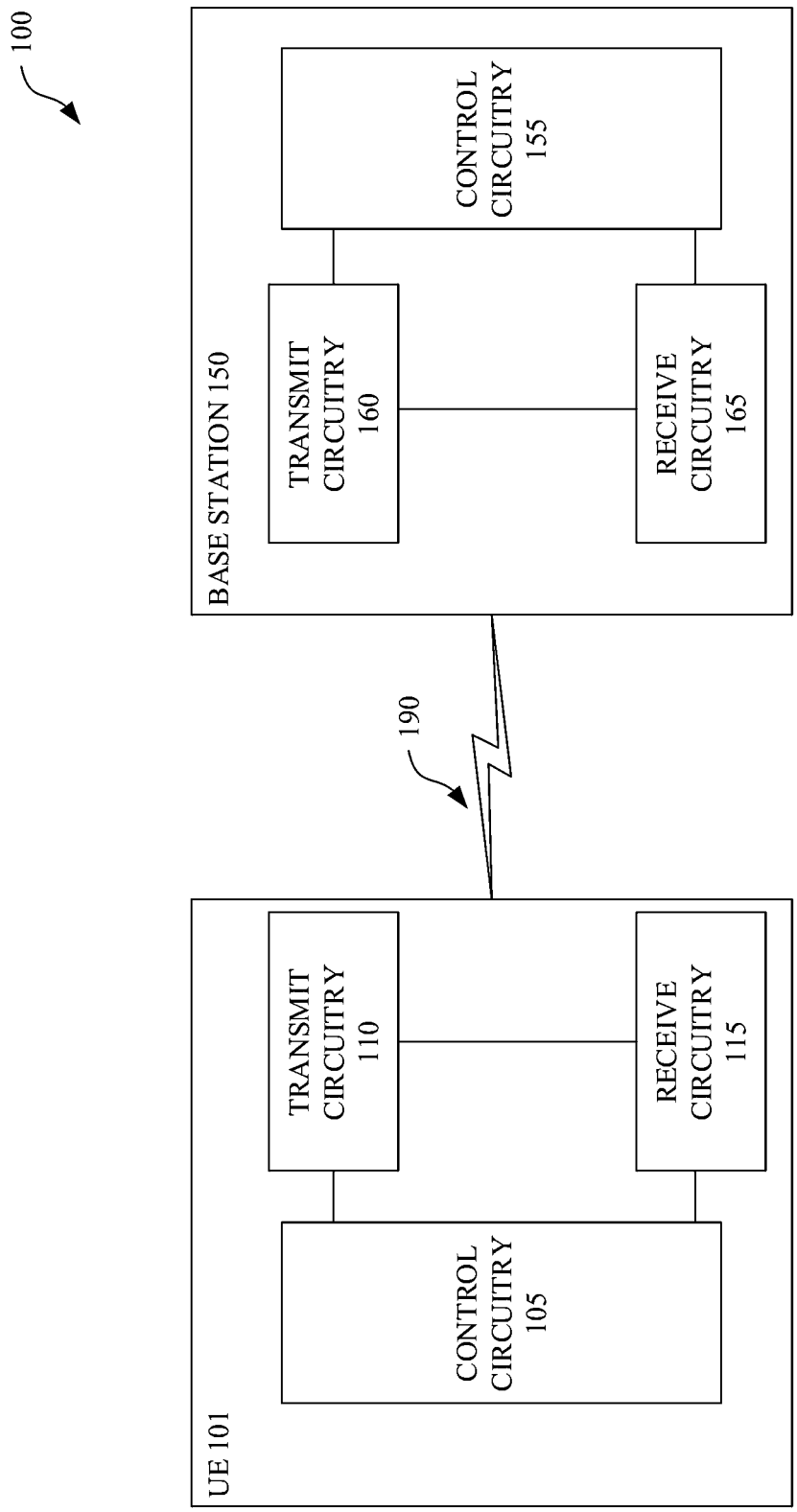
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and various base stations (for example, base stations that support all kinds of serving cells including PCell (or PSCell) and SCell, or base stations that act as the network device of PCell or SCell for communicating with the UE) described in the following embodiments may be implemented by the UE 101 and the base station 150 described in FIG. 1.

Figure 2:
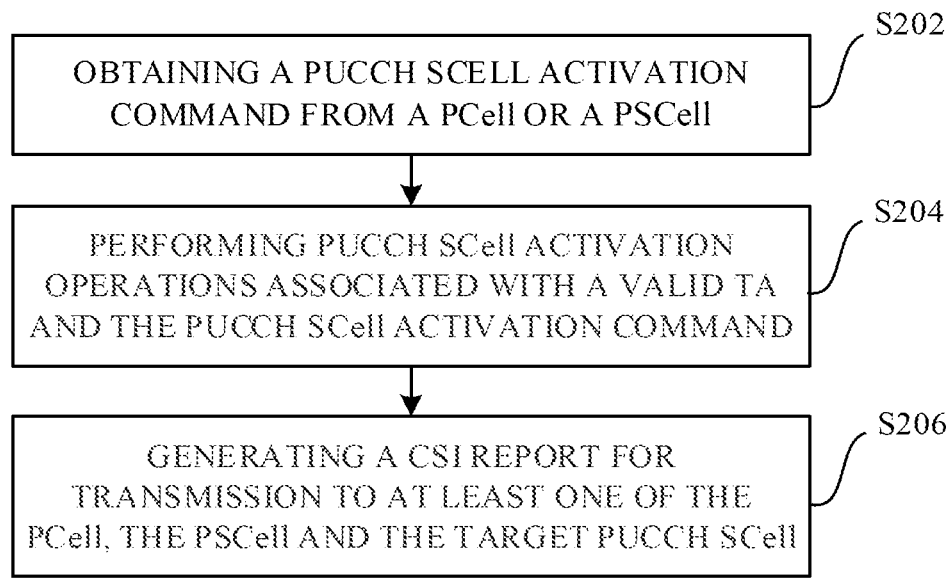
FIG. 2 illustrates a flowchart for an exemplary method for a user equipment in accordance with some embodiments.

FIG. 2 illustrates a flowchart for an exemplary method for a user equipment in accordance with some embodiments. The method 200 illustrated in FIG. 2 may be implemented by the UE 101 described in FIG. 1.

In some embodiments, the method 200 for UE may include the following steps: S202, obtaining a physical uplink control channel (PUCCH) secondary cell (SCell) activation command from a primary cell (PCell) or primary secondary-cell-group cell (PSCell), wherein the PUCCH SCell activation command is used for an PUCCH SCell activation of a target PUCCH SCell for the UE; S204, performing PUCCH SCell activation operations associated with a valid timing advance (TA) and the PUCCH SCell activation command, wherein a TA is considered to be a valid TA when the TA meets a preset criterion; and S206, generating a channel state information (CSI) report for transmission to at least one of the PCell, PSCell and the target PUCCH SCell, wherein the CSI report indicates that the PUCCH SCell activation is completed.

According to some embodiments of the present disclosure, after obtaining a PUCCH SCell activation command from PCell, by performing PUCCH SCell activation operations associated with a valid TA and the PUCCH SCell activation command, no matter a valid TA is previously provided or not, the UE can obtain a valid TA during the PUCCH SCell activation from the PUCCH SCell, thereby achieving the PUCCH SCell activation.

In the following, each step of the method 200 will be described in details.

At step S202, the UE may obtain a PUCCH SCell activation command from a PCell, wherein the PUCCH SCell activation command is used for an PUCCH SCell activation of a target PUCCH SCell for the UE.

Note that, in the present disclosure, when reference is made to PCell, it also refers to PSCell.

Also note that, in the present disclosure, when describing a communication between a UE and a network (for example, transmitting to a network, receiving from a network), the communication between the UE and the network may include the communication between the UE/an apparatus of the UE and the network/a network device (node) in the network. Similarly, in the present disclosure, when describing a communication between a UE and a serving cell including but not limiting to PCell (or PSCell) and SCell (for example, transmitting to PCell (or PSCell) or SCell, receiving from PCell (or PSCell) or SCell), the communication between the UE and the serving cell may include the communication between the UE/an apparatus of the UE and the network device (node) of the cell including but not limiting to PCell (or PSCell) and SCell. Also note that, the expressions "network device" and the expression "node" may be used herein interchangeably. In other words, when reference is made to "network device", it also refers to "node".

For example, obtaining a PUCCH SCell activation command from a PCell or PSCell may include obtaining a PUCCH SCell activation command from a network device of PCell or PSCell. As another example, generating a channel state information (CSI) report for transmission to at least one of the PCell (or PSCell) and the target PUCCH SCell may include generating a CSI report for transmission to at least one of the network device of the PCell (or PSCell) and the network device of the target PUCCH SCell.

In some embodiments, PUCCH SCell activation may include an SCell activation with PUCCH. In other words, the PUCCH SCell activation may include an activation of SCell that involves uplink (UL) transmission. However, note that although the SCell activation herein is recited as the "PUCCH" SCell activation, the present disclosure does not intent to exclude the SCell activation with downlink (DL) transmission from the expression "PUCCH SCell activation". Instead, throughout the whole disclosure, the "PUCCH SCell activation" may include activation of SCell with UL transmission and DL transmission.

In some embodiments, a target PUCCH SCell may be added for the UE, and then the target PUCCH SCell may be activated from a deactivation state according to the PUCCH SCell activation command. In some embodiments, a target PUCCH SCell may be the only SCell that has already been added for the UE. In some embodiments, a target PUCCH SCell may be one of a plurality of candidate SCells that have been already added for the UE. For example, the PCell or PSCell may determine which SCell of the plurality of candidate SCells that have been already added for the UE is the target PUCCH SCell.

In some embodiments, the PCell or PSCell may generate a PUCCH SCell activation command and transmit the PUCCH SCell activation command to the UE to initiate the procedure of PUCCH SCell activation of a target PUCCH SCell for the UE.

In some embodiments, the PUCCH SCell activation command may include a mapping information associated with the target PUCCH SCell. For example, the mapping information may include the time when the target PUCCH SCell transmits the reference signal. As another example, the mapping information may include the time interval between two reference signals that are transmitted by the target PUCCH SCell. In some embodiments, the mapping information may be used by the UE for monitoring the target PUCCH SCell, in order to achieve the PUCCH SCell activation.

In some embodiments, after obtaining a PUCCH SCell activation command from the PCell or PSCell, the UE may generate a hybrid automatic repeat request (HARQ) signaling for transmission to the PCell or PSCell, wherein the HARQ signaling indicates that the UE has received the PUCCH SCell activation command.

In some embodiments, the UE may generate a HARQ signaling and transmit the HARQ signaling to the PCell or PSCell for the acknowledgement of receiving the PUCCH SCell activation command transmitted from the PCell or PSCell, wherein the PUCCH SCell activation command may include the mapping information that may be used for the PUCCH SCell activation operations as discussed below.

According to some embodiments of the present disclosure, after obtaining a PUCCH SCell activation command from the PCell or PSCell, by transmitting a HARQ signaling to the PCell or PSCell, the network device of PCell or PSCell can be informed that the UE has already received the PUCCH SCell activation command and is ready to proceed to the activation of a target PUCCH SCell, thereby facilitating the PUCCH SCell activation.

At step S204, the UE may perform PUCCH SCell activation operations associated with a valid TA and the PUCCH SCell activation command, wherein a TA is considered to be a valid TA when the TA meets a preset criterion.

In some embodiments, the preset criterion may be that a parameter TimeAlignmentTimer associated with a timing advance group (TAG) containing the target PUCCH SCell is running In other words, a TA is considered to be valid provided that the TimeAlignmentTimer associated with the TAG containing the PUCCH SCell is running. For example, the parameter timeAlignmentTimer (per TAG) for the maintenance of UL time alignment controls how long a MAC entity considers serving cells including PCell (or PSCell) and SCell belonging to the associated TAG to be uplink time aligned.

In some embodiments, PUCCH SCell activation operations associated with a valid TA may include obtaining a valid TA during the PUCCH SCell activation operations. In some embodiments, the valid TA may include the TA that is associated with the target PUCCH SCell. In some embodiments, the valid TA may be not previously provided for the UE before obtaining the PUCCH SCell activation command from the PCell or PSCell. For example, the TA associated with the target PUCCH SCell may be invalid for the UE.

In some embodiments, performing PUCCH SCell activation operations associated with the valid TA and the PUCCH SCell activation command may include performing uplink (UL) PUCCH SCell activation operations associated with the valid TA and the PUCCH SCell activation command. In some embodiments, prior to performing UL PUCCH SCell activation operations associated with the valid TA and the PUCCH SCell activation command, performing PUCCH SCell activation operations associated with the valid TA and the PUCCH SCell activation command may further include performing downlink (DL) PUCCH SCell activation operations associated with the PUCCH SCell activation command. In some embodiments, DL PUCCH SCell activation operations associated with the PUCCH SCell activation command may include target PUCCH SCell synchronization, T/F tracking, AGC settling and CSI resource measurement on the target PUCCH SCell.

In some embodiments, during the DL PUCCH SCell activation operations associated with the PUCCH SCell activation command, the UE may unilaterally perform the DL synchronization on DL of the target PUCCH SCell and unilaterally keep CSI-RS measurement on DL of target PUCCH SCell. In other words, the target PUCCH SCell does not "realize" that it was synchronized or measured by the UE during the DL PUCCH SCell activation operations associated with the PUCCH SCell activation command.

According to some embodiments of the present disclosure, by performing DL PUCCH SCell activation operations associated with the PUCCH SCell activation command, DL synchronization and CSI-RS measurement can be done by the UE to facilitate the procedure of PUCCH SCell activation.

In some embodiments, after performing DL PUCCH SCell activation operations associated with the PUCCH SCell activation command, the UE may perform uplink (UL) PUCCH SCell activation operations associated with the valid TA and the PUCCH SCell activation command. In some embodiments, performing UL PUCCH SCell activation operations associated with a valid TA may include obtaining a valid TA during the UL PUCCH SCell activation operations.

Note that DL PUCCH SCell activation operations do not involve obtaining a valid TA, while UL PUCCH SCell activation operations include the step of obtaining a valid TA and applying a valid since the UL PUCCH SCell activation operations is associated with both the PUCCH SCell activation command and the valid TA.

In some embodiments, performing UL PUCCH SCell activation operations associated with the valid TA and the PUCCH SCell activation command may include: during a first time period: monitoring a physical random access channel (PRACH) occasion for the target PUCCH SCell; and generating a PRACH preamble for transmission to the target PUCCH SCell at the PRACH occasion.

In some embodiments, when adding a SCell, the PCell or PSCell may inform the UE when the UE is able to transmit the PRACH preamble to the SCell. Thus, when the SCell is selected as the target PUCCH SCell, the UE may know itself the specific time point at which the UE is able to transmit the PRACH preamble to the target PUCCH SCell. In some embodiments, the UE may wait until the time point at which the UE is able to transmit the PRACH preamble to the target PUCCH SCell is arrived.

In some embodiments, the first time period $T_1$ may include the delay uncertainty in acquiring the first available PRACH occasion in the PUCCH SCell. In some embodiments, the first time period $T_1$ may be equal to a sum of a synchronization signal/physical broadcast channel (SS/PBCH) block to PRACH occasion association period and a predetermined time period.

For example, the SS/PBCH block to PRACH occasion association period may be determined according to the following Table 1 of the mapping between PRACH configuration period and SS/PBCH block to PRACH occasion association period.

TABLE 1

Mapping between PRACH configuration period and SS/PBCH block to PRACH occasion association period

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

For example, the predetermined time period may be 10 milliseconds (ms).

In some embodiments, the first available PRACH occasion may include the first PRACH occasion that the UE is available to transmit the PRACH preamble (msg 1) to the target PUCCH SCell. In some embodiments, the PRACH occasion is obtained from the PCell or PSCell during an addition of the target PUCCH SCell. The UE may monitor the PRACH occasion itself and transmit the PRACH preamble (msg 1) to the target PUCCH SCell on UL of the target PUCCH SCell.

According to some embodiments of the present disclosure, by generating a PRACH preamble for transmission to the target PUCCH SCell at the PRACH occasion during the first time period, the target PUCCH SCell can be informed that the UE is willing to activate the target PUCCH (for example, before this operation, during the above mentioned DL PUCCH SCell activation operations, the target PUCCH SCell does not "realize" that it will be activated) and would like to obtain a valid TA associated with the target PUCCH SCell from the target PUCCH SCell, thereby facilitating the procedure of PUCCH SCell activation.

In some embodiments, performing UL PUCCH SCell activation associated with the valid TA and the PUCCH SCell activation command may further include: during a second time period subsequent to the first time period: obtaining a first available random access response (RAR) from the SCell that includes an information associated with the valid TA.

In some embodiments, the second time period $T_2$ may include the delay from the end of the first time period as discussed above until the UE has obtained an information associated with the valid TA for the target PUCCH SCell.

In some embodiments, the UE may open a RAR window to receive a first available RAR, wherein the first available RAR may include the first RAR received by the UE from the target PUCCH SCell that is available to provide the valid TA, that is, including the information associated with the valid TA.

For example, if the first RAR received by the UE during the second time period $T_2$ does not provide the information including the valid TA associated with the target PUCCH SCell while the second RAR received by the UE during the second time period provides the information including the valid TA associated with the target PUCCH SCell, then the second RAR received by the UE may be considered as the first available RAR while the first RAR received by the UE may not be considered as the first available RAR since it fails to provide the information including the valid TA.

As another example, if the first RAR received by the UE during the second time period does not provide the information including the valid TA associated with the target PUCCH SCell, the UE may decide not to receive RAR any more, then there is no first available RAR.

According to some embodiments of the present disclosure, by obtaining a first available RAR from the SCell that includes an information associated with the valid TA, the UE can obtain the valid TA for activate the target PUCCH SCell, thereby facilitating the procedure of PUCCH SCell activation.

In some embodiments, obtaining the first available RAR may include: obtaining a RAR from the target PUCCH SCell; and determining whether the RAR includes the information associated with the valid TA. As discussed above, the RAR from the target PUCCH SCell may not provide the information associated with the valid TA for the target PUCCH SCell, and the UE may determine if the received RAR including the information associated with the valid TA for the target PUCCH SCell. In other words, the UE may determine if the received RAR can provide the valid TA.

In some embodiments, in response to determining that the RAR does not include the information associated with the valid TA, the UE may wait for a next RAR, until obtaining the first available RAR that includes the information associated with the valid TA. In some embodiments, if the first RAR received by the UE does not provide the valid TA associated with the target PUCCH SCell, then the UE may wait for a next RAR and determine if the next RAR is capable of providing the valid TA. For example, the UE may keep waiting until it has obtained the information associated with the valid TA.

According to some embodiments of the present disclosure, by keep waiting until the UE has obtained the information associated with the valid TA, the possibility of obtaining a valid TA and achieving the PUCCH SCell activation will be increased.

In some embodiments, in response to determining that the RAR does not include the information associated with the valid TA, the UE may drop the PUCCH SCell activation of the target PUCCH SCell for the UE. In other words, if the RAR received by the UE does not provide the valid TA, the UE may determine to forgo the PUCCH SCell activation of the target PUCCH SCell.

According to some embodiments of the present disclosure, by dropping the PUCCH SCell activation of the target PUCCH SCell when the received RAR fails to provide a valid TA, the time resources for activation is reduced and the UE can benefit from the saved time resources for seeking for another PUCCH SCell as the target PUCCH SCell.

In some embodiments, the UE and/or the PCell or PSCell may preset a time duration threshold. For example, if the time duration of the second time period is within the time duration threshold, the UE may keep waiting for a first available RAR. If the time duration of the second time period exceeds or is equal to the time duration threshold, the UE may drop the PUCCH SCell activation of the target PUCCH SCell. As another example, if the time duration of the second time period is within or equal to the time duration threshold, the UE may keep waiting for a first available RAR. If the time duration of the second time period exceeds the time duration threshold, the UE may drop the PUCCH SCell activation of the target PUCCH SCell.

According to some embodiments of the present disclosure, by presetting a time duration threshold for the second time period, the procedure of obtaining the valid TA and thus the procedure of PUCCH SCell activation can be more flexible and controllable.

In some embodiments, performing UL PUCCH SCell activation operations associated with the valid TA and the PUCCH SCell activation command further includes: during a third time period subsequent to the second time period: decoding the information associated with the valid TA; and applying the valid TA to a UL physical layer based on the decoded information associated with the valid TA, such that a PUCCH transmission to the target PUCCH SCell is ready to be used.

In some embodiments, the third time period $T_3$ may include the delay for decoding the information associated with the valid TA and applying the received TA for uplink transmission on target PUCCH SCell being activated. In some embodiments, the third time period is greater than or equal to k+1 slots, and wherein $k=\lceil N_{slot}^{subframe,\mu} \cdot (N_{T,1}+N_{T,2}+N_{TA,max}+T_0)/T_{sf} \rceil$, where $N_{T,1}$ is a time duration of $N_1$ symbols corresponding to a physical downlink shared channel (PDSCH) processing time for UE processing capability 1 when additional PDSCH demodulation reference signal (DM-RS) is configured, $N_{T,2}$ is a time duration of $N_2$ symbols corresponding to a physical uplink shared channel (PUSCH) preparation time for UE processing capability 1, $N_{TA,max}$ is a maximum timing advance value that can be provided by a TA command field of 12 bits, $N_{slot}^{subframe,\mu}$ is a number of slot per subframe, and $T_{sf}$ is a subframe duration, $T_0$ is a preset time period, and where $N_1$ and $N_2$ are determined with respect to a minimum SCS among the SCSs of all configured UL bandwidth parts (BWPs) for all uplink carriers in a timing advance group (TAG) and of all configured DL BWPs for corresponding downlink carriers.

For example, $N_{T,1}$ $N_{T,2}$, $N_{TA,max}$, $T_{sf}$ and $T_0$ may be in millisecond, and $T_0$ may be 0.5 ms.

According to some embodiments of the present disclosure, by decoding the information associated with the valid TA and by implementing the decoded TA, the UE is ready for PUCCH transmission of the target PUCCH SCell, thereby facilitating the PUCCH SCell activation.

At step S206, the UE may generate a CSI report for transmission to at least one of the PCell, PSCell and the target PUCCH SCell, wherein the CSI report indicates that the PUCCH SCell activation is completed.

In some embodiment, the CSI report may indicate the PUCCH SCell activation is completed and UL transmission of UE on PUCCH SCell is ready to use. In some examples, the CSI report may be transmitted to PCell or PSCell by the UE to inform PCell or PSCell that the PUCCH SCell activation is accomplished. In some examples, the CSI report may be transmitted to the target PUCCH SCell by the UE to inform the target PUCCH SCell that the PUCCH SCell activation is accomplished. In some examples, the CSI report may be transmitted to both the PCell, PSCell and the target PUCCH SCell by the UE.

According to some embodiments of the present disclosure, by transmitting a CSI report to at least one of the PCell, PSCell and the target PUCCH SCell, the PCell (or PSCell) and/or the target PUCCH SCell can be informed that PUCCH SCell activation is complete and the UL transmission on the PUCCH SCell can be used.

Hereinafter, the time period for the procedure of PUCCH SCell activation will be described.

In some embodiments, upon receiving the PUCCH SCell activation command from the PCell or PSCell in slot N, the UE may perform PUCCH SCell activation operations and transmit the CSI report in a time period $T_{delay\_PUCCH\ SCell}$, wherein the UE may perform DL activation operations and transmit CSI report in a time period $T_{activate\_basic}$, and may perform UL activation operations in a time period $T_{delay\_PUCCH\ SCell}$. In some embodiments, the time period $T_{delay\_PUCCH\ SCell}$ is larger than the time period $T_{activate\_basic}$. In other words, the PUCCH SCell activation operations may be accomplished no later than in slot N+($T_{delay\_PUCCH\ SCell}$/NR slot length) where NR slot length is the length of a slot in NR.

In some embodiments, the relation between the time period $T_{delay\_PUCCH\ SCell}$ and the time period $T_{activate\_basic}$ may be formulated as follows.

$$T_{delay\_PUCCH\ SCell} = T_{activate\_basic} + T_1 + T_2 + T_3 \quad (1)$$

In the above formulation (1), $T_1$ is the first time period as discussed above, which may be the delay uncertainty in acquiring the first available PRACH occasion in the PUCCH SCell, $T_2$ is the second time period as discussed above, which may be the delay from the end of the first time period until the UE has obtained an information associated with the valid TA for the target PUCCH SCell, $T_3$ is the third time period as discussed above, which may be the delay for decoding the information associated with the valid TA and applying the received TA for uplink transmission on target PUCCH SCell being activated.

Figure 3:
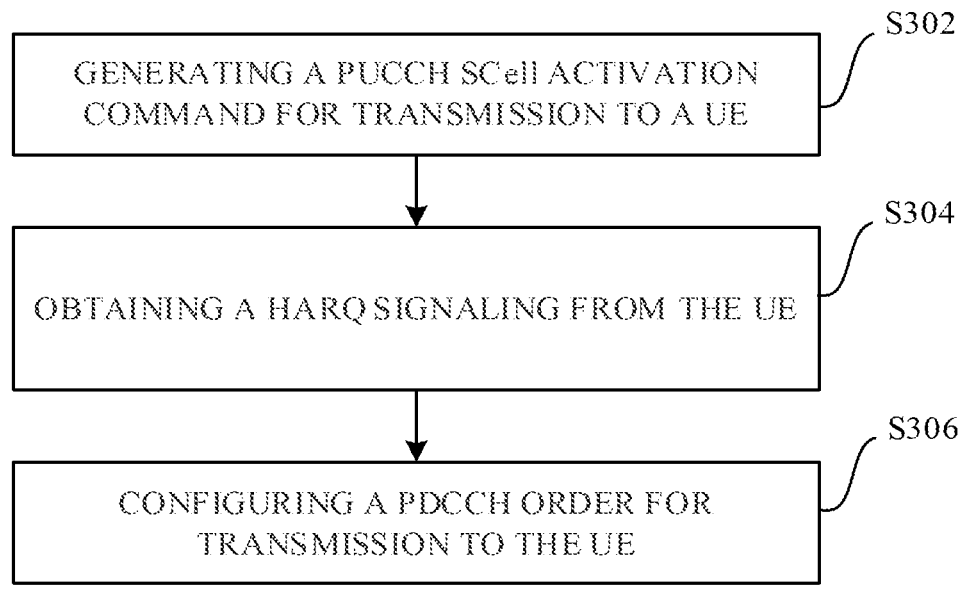
FIG. 3 illustrates a flowchart for an exemplary method for a network device of a primary cell (PCell) or primary secondary-cell-group cell (PSCell) in accordance with some embodiments.

FIG. 3 illustrates a flowchart for an exemplary method for a network device of a primary cell (PCell) or primary secondary-cell-group cell (PSCell) in accordance with some embodiments. The method 300 illustrated in FIG. 3 may be implemented by the base station 150 described in FIG. 1. For example, the network device of the PCell or PSCell may be the network device of the base station 150.

In some embodiments, the method 300 for a network device of a primary cell (PCell) or primary secondary-cell-group cell (PSCell) may include the following steps: S302, generating a physical uplink control channel (PUCCH) secondary cell (SCell) activation command for transmission to a user equipment (UE), wherein the PUCCH SCell activation command is used for a PUCCH SCell activation of a target PUCCH SCell for the UE; S304, obtaining a hybrid automatic repeat request (HARQ) signaling from the UE, wherein the HARQ signaling indicates that the UE has received the PUCCH SCell activation command; and S306, configuring a physical downlink control channel (PDCCH) order for transmission to the UE, wherein the PDCCH order requires the UE to initiate a random access (RA) procedure on the target PUCCH SCell.

According to some embodiments of the present disclosure, after generating a PUCCH SCell activation command, by obtaining a HARQ signaling from the UE, the network device of PCell or PSCell can be informed that the UE has already received the PUCCH SCell activation command and is ready to proceed to the activation of a target PUCCH SCell. Meanwhile, by configuring a PDCCH order and transmitting it to the UE, no matter a valid TA is previously provided or not, the UE can initiate a RA procedure on the target PUCCH SCell in order to obtain of a valid TA from the target PUCCH SCell, thereby achieving the PUCCH SCell activation.

In some embodiments, the network device of PCell or PSCell implementing the method 300 may be the same network device as the network device of SCell implementing the method 400 as discussed below. For example, one base station may act as the network device of both PCell (or PSCell) and SCell, wherein the base station may be but not limit to a Macro base station, a Micro base station, a Pico base station and a Femto base station. In some embodiments, the network device of PCell or PSCell implementing the method 300 may be a different network device from the network device of PCell or PSCell implementing the method 400 as discussed below. For example, one Macro base station may act as the network device of PCell or PSCell, while another Micro/Pico/Femto base station may act the network device of SCell.

In the following, each step of the method 300 will be described. Note that those elements, expressions, features, definitions that have already been described with reference to FIG. 2 and its corresponding description (about UE) are omitted herein for not obscure the present disclosure.

At step S302, the PCell (or PSCell) or the network device of the PCell (or PSCell) may generate a PUCCH SCell activation command for transmission to a UE, wherein the PUCCH SCell activation command is used for a PUCCH SCell activation of a target PUCCH SCell for the UE.

In some embodiments, the PCell (or PSCell) or the network device of the PCell (or PSCell) may transmit a PUCCH SCell activation command to the UE to initiate the PUCCH SCell activation of the target PUCCH SCell for the UE.

According to some embodiments of the present disclosure, by generating and transmitting a PUCCH SCell activation command to the UE, the UE can be informed that it shall perform PUCCH SCell activation operations associated with the valid TA and the PUCCH SCell activation command, thereby facilitating the PUCCH SCell activation.

At step S304, the PCell (or PSCell) or the network device or PCell (or PSCell) may obtain a HARQ signaling from the UE, wherein the HARQ signaling indicates that the UE has received the PUCCH SCell activation command.

In some embodiments, the network device of PCell or PSCell may receive a HARQ signaling, from the UE, for the acknowledgement of the PUCCH SCell activation command being received by the UE, wherein the PUCCH SCell activation command may include the mapping information that may be used for the PUCCH SCell activation operations as discussed below.

According to some embodiments of the present disclosure, after transmitting a PUCCH SCell activation command from the PCell or PSCell, by receiving a HARQ signaling from the UE, the network device of PCell or PSCell can be informed that the UE has already received the PUCCH SCell activation command and is ready to proceed to the activation of a target PUCCH SCell, thereby facilitating the PUCCH SCell activation.

At step S306, the PCell (or PSCell) and/or network device of the PCell (or PSCell) may configure a PDCCH order for transmission to the UE, wherein the PDCCH order requires the UE to initiate a RA procedure on the target PUCCH SCell.

In some embodiments, the PCell or PSCell may transmit a PDCCH order to initiate UE RA procedure on the PUCCH SCell. In some embodiments, the time instant for transmitting the PDCCH order is after the transmission of the PUCCH SCell activation command but is before the first time period as discussed above.

According to some embodiments of the present disclosure, by transmitting a PDCCH order to the UE from the PCell or PSCell, the UE can proceed to a RA procedure to obtain the valid TA, thereby facilitating the PUCCH SCell activation.

In some embodiments, the PCell (or PSCell) and/or the network of the PCell (or PSCell) may obtain a channel state information (CSI) report from the UE, wherein the CSI report indicates that the PUCCH SCell activation is completed.

According to some embodiments of the present disclosure, by receiving a CSI report from the UE, the PCell or PSCell can be informed that PUCCH SCell activation is complete and the UL transmission on the PUCCH SCell can be used.

In some embodiments, the PCell (or PSCell)/the network device of the PCell (or PSCell) does not configure, for transmission to the UE, UE activities that cause interruption during the PUCCH SCell activation of the target PUCCH SCell for the UE.

Sometime, during the PUCCH SCell activation, some UE activities may interrupt the PUCCH SCell activation. In some cases, if the UE supports per-frequency range measurement gap (FR MG), the corresponding UE activities that may cause the interruption may occur in the same FR as the target PUCCH SCell. In some cases, if the UE does not support per-FR MG, the corresponding UE activities that may cause the interruption may occur during the procedure of PUCCH SCell activation.

Therefore, in some embodiments, the PCell (or PSCell)/ the network device of the PCell (or PSCell) does not configure the corresponding UE activities to avoid interruption occurs in the same FR as the target PUCCH SCell during the SCell activation procedure if UE supports per-FR MG. In some embodiments, the PCell (or PSCell)/the network device of the PCell (or PSCell) does not configure the corresponding UE activities to avoid interruption occurs during the SCell activation procedure if UE does not support per-FR MG.

In some embodiments, the corresponding UE activities that may cause interruption for E-UTRA-NR Dual Connectivity (EN-DC), for New Radio standalone (NR SA), for NR-E-UTRA Dual Connectivity (NE-DC) and for NR-NR Dual Connectivity (NR-DC) are listed in the following for exemplary purpose only.

For EN-DC, the interruption may include but not limit to at least one of the following: E-UTRA PCell transitions between active and non-active during DRX; E-UTRA PCell transitions from non-DRX to DRX; E-UTRA SCell in MCG or SCell in SCG being added or released; E-UTRA SCell in MCG or SCell(s) in SCG being activated or deactivated; measurements on SCC with deactivated SCell in either E-UTRA MCG or NR SCG; a supplementary UL carrier or an UL carrier being configured or de-configured; UL/DL BWP being switched on PSCell or SCell in SCG; UE-specific CBW being changed on PSCell or SCell in SCG; CGI reading of an NR neighbour cell with autonomous gaps; CGI reading of an E-UTRA neighbour cell with autonomous gaps; NR SRS carrier based switching; E-UTRA SRS carrier based switching; UE dynamic Tx switching between two uplink carriers.

For NR SA, the interruption may include but not limit to at least one of the following: up to 7 SCells are configured, de-configured, activated or deactivated; a supplementary UL carrier or an UL carrier being configured or de-configured; measurements on SCC with deactivated SCell in NR SCG; UL/DL BWP being switched on PCell or SCell; CGI reading of an NR neighbour cell with autonomous gaps; CGI reading of an E-UTRA neighbour cell with autonomous gaps; UE-specific CBW being changed on PCell or SCell; NR SRS carrier based switching; UE dynamic Tx switching between two uplink carriers.

For NE-DC, the interruption may include but not limit to at least one of the following: E-UTRA PSCell transitions between active and non-active during DRX; E-UTRA PSCell transitions from non-DRX to DRX; E-UTRA PSCell/SCell in SCG or SCell in MCG being added or released; E-UTRA PSCell/SCell in SCG or SCell(s) in MCG being activated or deactivated; measurements on SCC with deactivated SCell in either E-UTRA SCG or NR MCG; PUSCH/PUCCH carrier configuration and deconfiguration in NR MCG; UL/DL BWP being switched on PCell or SCell in MCG; CGI reading of an NR neighbour cell with autonomous gaps; CGI reading of an E-UTRA neighbour cell with autonomous gaps; NR SRS carrier based switching; E-UTRA SRS carrier based switching.

For NR-DC, the interruption may include but not limit to at least one of the following: up to 1 SCell in FR1 and up to 7 SCell(s) in FR2 being configured, deconfigured, activated or deactivated; a supplementary UL carrier or an UL carrier being configured or de-configured; measurements on SCC with deactivated SCell in NR SCG; UL/DL BWP being switched on PCell, PSCell or SCell; transitions between active and non-active during DRX; transitions from non-DRX to DRX; CGI reading of an NR neighbour cell with autonomous gaps; CGI reading of an E-UTRA neighbour cell with autonomous gaps; NR SRS carrier based switching.

According to some embodiments of the present disclosure, by not configuring the corresponding UE activities that may cause interruptions, the PCell (or PSCell)/the network of the PCell (or PSCell) can avoid interruptions during the PUCCH SCell activation no matter UE supports per-FR MG or not.

Figure 4:
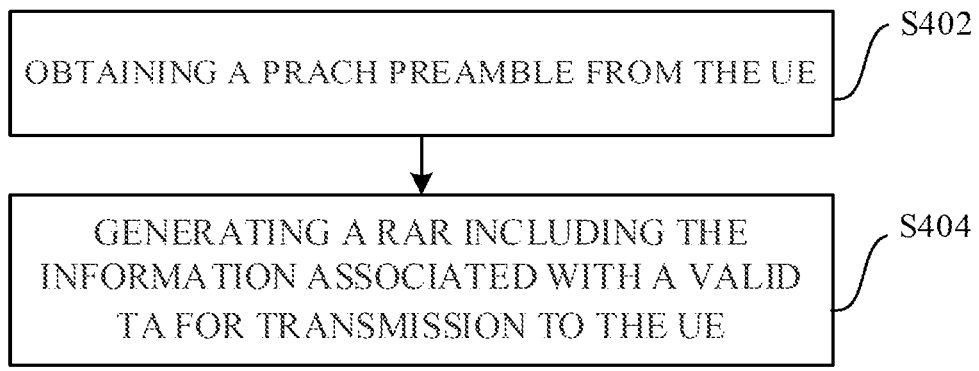
FIG. 4 illustrates a flowchart for an exemplary method for a network device of a secondary cell (SCell) in accordance with some embodiments.

FIG. 4 illustrates a flowchart for an exemplary method for a network device of a secondary cell (SCell) in accordance with some embodiments. The method 400 illustrated in FIG. 4 may be implemented by the base station 150 described in FIG. 1. For example, the network device of the SCell may be the network device of the base station 150.

In some embodiments, in the method 400 for a network device of a PCell or PSCell, the SCell is a target PUCCH SCell to be activated for a user equipment (UE). The method 400 for a network device of PCell or PSCell may include the following steps: S402, obtaining a physical random access channel (PRACH) preamble from the UE; and S404, generating a random access response (RAR) including the information associated with a valid Timing Advance (TA) for transmission to the UE, wherein a TA is considered to be a valid TA when the TA meets a preset criterion.

In some embodiments, the preset criterion may be that a parameter TimeAlignmentTimer associated with a timing advance group (TAG) containing the SCell is running.

According to some embodiments of the present disclosure, by generating a RAR including the information associated with a valid TA, the network device of the target PUCCH SCell can provide a valid TA to the UE, such that no matter a valid TA is previously provided or not, the UE can obtain a valid TA during the PUCCH SCell activation from the target PUCCH SCell, thereby achieving the PUCCH SCell activation.

In some embodiments, the network device of SCell implementing the method 400 may be the same network device as the network device of PCell or PSCell implementing the method 300 as discussed above. In some embodiments, the network device of SCell implementing the method 400 may be a different network device from the network device of PCell or PSCell implementing the method 300 as discussed above.

In the following, each step of the method 400 will be described. Note that those elements, expressions, features etc. that have already been described with reference to FIG. 2 and its corresponding description (about UE) are omitted herein for clarity.

At step S402, the network may obtain a PRACH preamble from the UE.

According to some embodiments of the present disclosure, by receiving a PRACH preamble from the UE, the SCell can be informed that it is selected as the target PUCCH SCell, and the target PUCCH SCell can be informed that it will be activated by the UE and it shall provide a valid TA associated with itself to the UE, thereby facilitating the procedure of PUCCH SCell activation.

At step S404, the network may generate a RAR including the information associated with a valid TA for transmission to the UE, wherein a TA is considered to be a valid TA when the TA meets a preset criterion.

According to some embodiments of the present disclosure, by transmitting the RAR that includes an information associated with the valid TA to the UE, the target PUCCH SCell can provide the valid TA for activate the target PUCCH SCell to the UE, thereby facilitating the procedure of PUCCH SCell activation.

In some embodiments, the SCell/the network device of the SCell may include: obtaining a channel state information (CSI) report from the UE, wherein the CSI report indicates that the PUCCH SCell activation is completed.

According to some embodiments of the present disclosure, by receiving a CSI report from the UE, the SCell can be informed that PUCCH SCell activation is complete and the UL transmission on the PUCCH SCell can be used.

Figure 5:
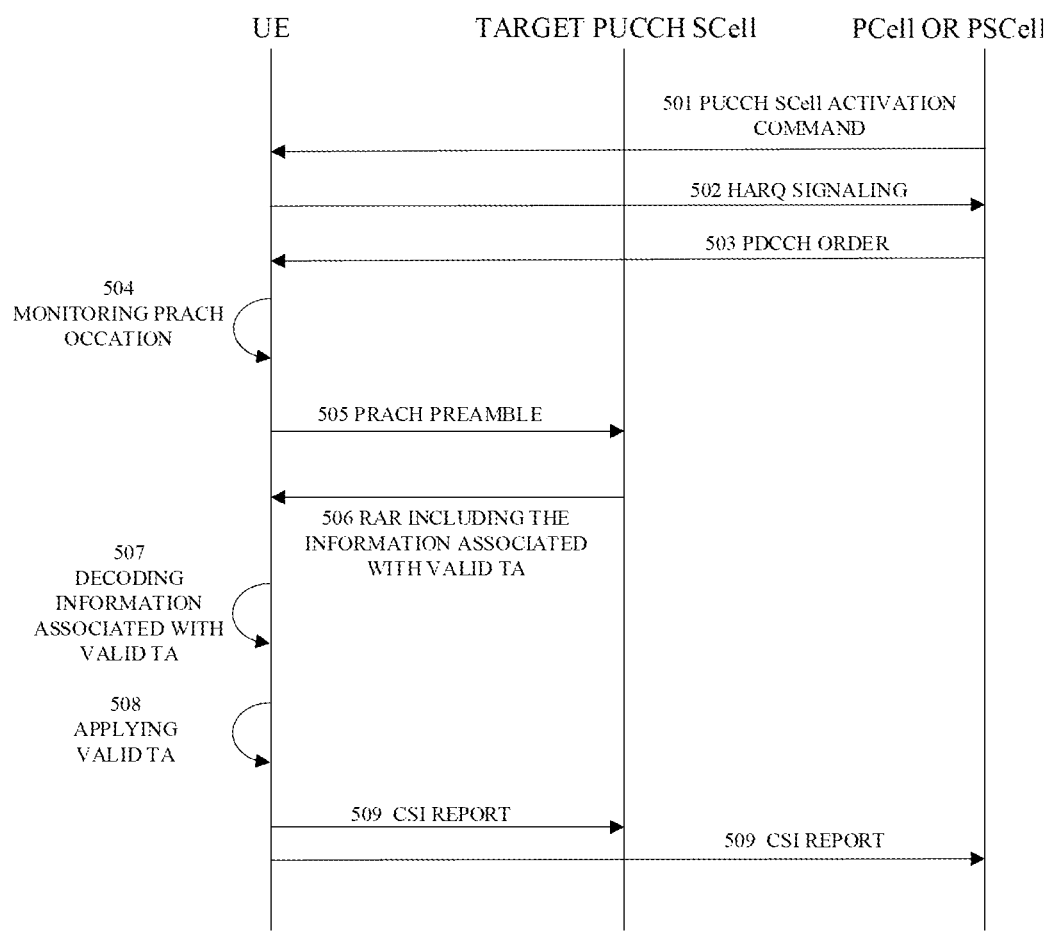
FIG. 5 illustrates a flowchart for exemplary steps for physical uplink control channel (PUCCH) SCell activation.

FIG. 5 illustrates a flowchart for exemplary steps for physical uplink control channel (PUCCH) SCell activation.

In FIG. 5, the steps of the method for UE, the method for network device of PCell or PSCell and the method for network device of SCell during the PUCCH SCell activation are shown.

Before Step 501 of transmitting a PUCCH SCell activation command used for activating a target PUCCH SCell for the UE, the target PUCCH SCell has been added.

At Step 501, the PCell or PSCell may transmit a PUCCH SCell activation command to the UE. Step 501 can be implemented according to the description with reference to Step S202 and/or Step S302.

At Step 502, in response to receiving the PUCCH SCell activation command from the PCell or PSCell, the UE may transmit a HARQ signaling to the PCell or PSCell to inform that the UE has received the PUCCH SCell activation command and will start to perform the activation operations. Step 502 can be implemented according to the description with reference to Step S304.

At Step 503, the PCell or PSCell transmit a PDCCH order to the UE, such that the UE may initiate Random Access procedure on the PUCCH SCell. Step 503 can be implemented according to the description with reference to Step S306.

After Step 502 and before Step 504, the UE may perform DL PUCCH SCell activation operations including target PUCCH SCell synchronization, T/F tracking, AGC settling and CSI resource measurement on the target PUCCH SCell.

At Step 504, the UE may monitor the PRACH occasion until arriving at the first available PRACH occasion for transmission to PRACH preamble.

At Step 505, the UE may transmit the PRACH preamble at the first available PRACH occasion to the target PUCCH SCell. Step 505 can be implemented according to the description with reference to Step S402.

At Step 506, in response to receiving the PRACH preamble from the UE, the target PUCCH SCell may transmit a RAR including the information associated with the valid TA to the UE. Step 506 can be implemented according to the description with reference to Step S404.

At Step 507, upon receiving the RAR including the information associated with the valid TA from the target PUCCH SCell, the UE may decode the information associated with the valid TA.

At Step 508, after the information associated with the valid TA is decoded by the UE, the UE may apply the valid TA to a UL physical layer based on the decoded information associated with the valid, such that a PUCCH transmission to the target PUCCH SCell is ready to be used.

At Step 509, after the TA is applied, the UE may transmit a CSI report to at least one of PCell, PSCell and the target PUCCH SCell to indicate that the PUCCH SCell activation is complete and the UL transmission on the target PUCCH SCell is ready to use. Step 509 can be implemented according to the description with reference to Step S206.

After Step 509, UL transmission can be used on the target PUCCH SCell due to the completion of the PUCCH SCell activation.

In the above, the procedure of PUCCH SCell activation is described in details in combination of FIGS. 2-5. In the following, the procedure of PUCCH SCell deactivation will be described in brief.

In some embodiments, the procedure of PUCCH SCell deactivation may not heavily rely on the valid TA, and therefore no matter a TA is valid or invalid, there is no need to obtain a valid TA during the PUCCH SCell deactivation.

In some embodiments, the procedure of PUCCH SCell deactivation may begin with a PUCCH SCell deactivation command. In some embodiments, the PCell or PSCell generates the PUCCH SCell deactivation command for transmission to the UE. In some embodiments, the UE may obtain (or receive) a PUCCH SCell deactivation command from the PCell or PSCell. Upon receiving the PUCCH SCell deactivation command, the UE may perform PUCCH SCell deactivation operations. In some embodiments, performing PUCCH SCell deactivation operations may include but not limit to performing the RF adjustment and AGC adjustment to deactivate the target PUCCH SCell.

From the view of time period of the procedure of PUCCH SCell deactivation, for example, upon receiving the PUCCH SCell deactivation command at slot N, the UE shall accomplish the deactivation actions for the SCell being deactivated no later than in slot $$N + \frac{T_{HARQ} + 3ms}{NR \text{ slot length}},$$

where $T_{HARQ}$ is in millisecond and is the timing between DL data transmission and acknowledgement, and NR slot length is the length of a slot in NR.

To avoid interruption, the starting point of an interruption window on PCell (or PSCell) or any activated SCell shall not occur before slot $$N + 1 + \frac{T_{HARQ}}{NR \text{ slot length}}$$

and not occur after slot $$N + 1 + \frac{T_{HARQ} + 3ms}{NR \text{ slot length}},$$

where $T_{HARQ}$ is in millisecond and is the timing between DL data transmission and acknowledgement, and NR slot length is the length of a slot in NR.

In some embodiments, the procedure of PUCCH SCell deactivation may begin with an expiry of the parameter sCellDeactivationTimer. In some embodiments, the UE may monitor the parameter sCellDeactivationTimer. Upon expiry of the parameter sCellDeactivationTimer, the UE may perform PUCCH SCell deactivation operations. In some embodiments, performing PUCCH SCell deactivation operations may include but not limit to performing the RF adjustment and AGC adjustment to deactivate the target PUCCH SCell.

From the view of time period of the procedure of PUCCH SCell deactivation, for example, upon expiry of the parameter sCellDeactivationTimer in slot N, the UE shall accomplish the deactivation actions for the SCell being deactivated no later than in slot $$N + \frac{3ms}{NR \text{ slot length}},$$

where NR slot length is the length of a slot in NR.

To avoid interruption, the starting point of an interruption window on PCell (or PSCell) or any activated SCell shall not occur before slot N+1 and not occur after slot $$N + 1 + \frac{3ms}{NR \text{ slot length}}$$

where NR slot length is the length of a slot in NR.

In some embodiments, the length of the interruption window may be different for different victim cells, and depends on the applicable scenario and on the frequency band relation between the aggressor cell and the victim cell.

According to some embodiments of the present disclosure, no matter the TA is valid or invalid, upon receiving the PUCCH SCell deactivation command or expiry of the parameter sCellDeactivationTimer, the UE can achieve the target PUCCH SCell deactivation.

Figure 6:
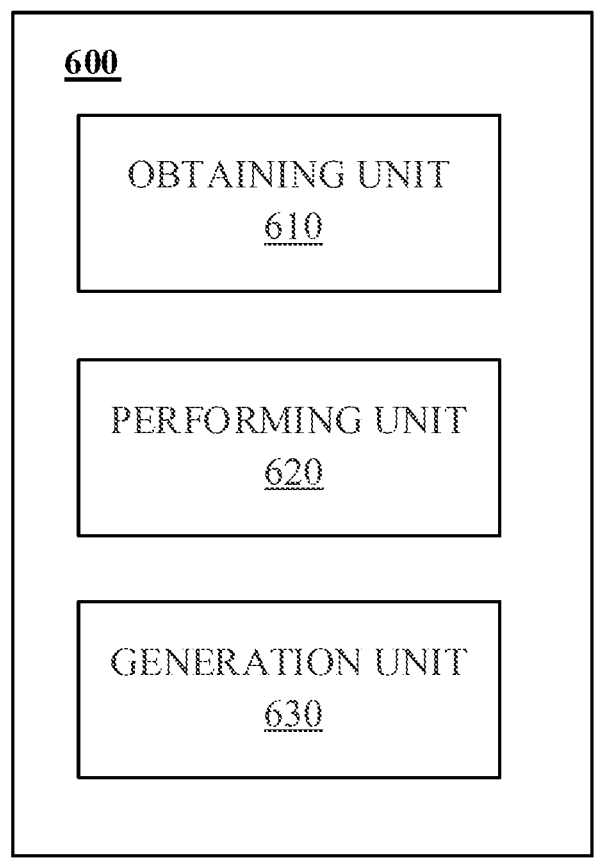
FIG. 6 illustrates an exemplary block diagram of an apparatus for a UE in accordance with some embodiments.

FIG. 6 illustrates an exemplary block diagram of an apparatus for a UE in accordance with some embodiments. The apparatus 600 illustrated in FIG. 6 may be used to implement the method 200 as illustrated in combination with FIG. 2.

As illustrated in FIG. 6, the apparatus 600 includes an obtaining unit 610, a performing unit 620 and a generation unit 630.

The obtaining unit 610 may be configured to obtain a physical uplink control channel (PUCCH) secondary cell (SCell) activation command from a primary cell (PCell) or primary secondary-cell-group cell (PSCell), wherein the PUCCH SCell activation command is used for an PUCCH SCell activation of a target PUCCH SCell for the UE.

The performing unit 620 may be configured to perform PUCCH SCell activation operations associated with a valid timing advance (TA) and the PUCCH SCell activation command, wherein a TA is considered to be a valid TA when the TA meets a preset criterion.

The generation unit 630 may be configured to generate a channel state information (CSI) report for transmission to at least one of the PCell, PSCell and the target PUCCH SCell, wherein the CSI report indicates that the PUCCH SCell activation is completed.

According to the embodiments of the present application, after obtaining a PUCCH SCell activation command from PCell or PSCell, by performing PUCCH SCell activation operations associated with a valid TA and the PUCCH SCell activation command, no matter a valid TA is provided or not, the UE can obtain a valid TA during the PUCCH SCell activation, thereby achieving the PUCCH SCell activation.

Figure 7:
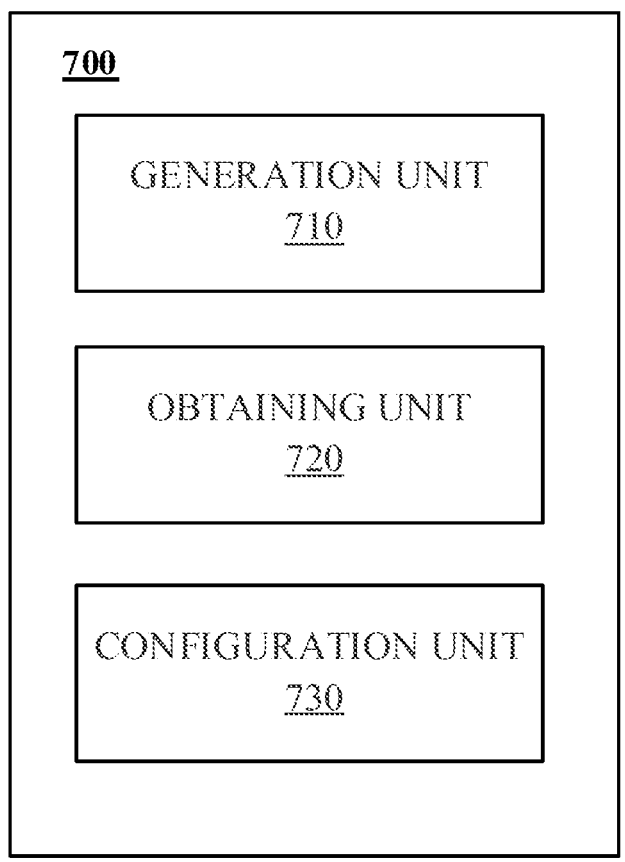
FIG. 7 illustrates an exemplary block diagram of an apparatus for a network device of PCell or PSCell in accordance with some embodiments.

FIG. 7 illustrates an exemplary block diagram of an apparatus for a network device of PCell or PSCell in accordance with some embodiments. The apparatus 700 illustrated in FIG. 7 may be used to implement the method 300 as illustrated in combination with FIG. 3.

As illustrated in FIG. 7, the apparatus 700 includes a generation unit 710, an obtaining unit 720 and a configuration unit 730.

The generation unit 710 may be configured to generate a physical uplink control channel (PUCCH) secondary cell (SCell) activation command for transmission to a user equipment (UE), wherein the PUCCH SCell activation command is used for a PUCCH SCell activation of a target PUCCH SCell for the UE.

The obtaining unit 720 may be configured to obtain a hybrid automatic repeat request (HARQ) signaling from the UE, wherein the HARQ signaling indicates that the UE has received the PUCCH SCell activation command.

The configuration unit 730 may be configured to configure a physical downlink control channel (PDCCH) order for transmission to the UE, wherein the PDCCH order requires the UE to initiate a random access (RA) procedure on the target PUCCH SCell.

According to some embodiments of the present disclosure, after generating a PUCCH SCell activation command, by obtaining a HARQ signaling from the UE, the network device of PCell or PSCell can be informed that the UE has already received the PUCCH SCell activation command and is ready to proceed to the activation of a target PUCCH SCell. Meanwhile, by configuring a PDCCH order and transmitting it to the UE, no matter a valid TA is provided or not, the UE can initiate a RA procedure on the target PUCCH SCell in order to obtain of a valid TA from the target PUCCH SCell, thereby achieving the PUCCH SCell activation.

Figure 8:
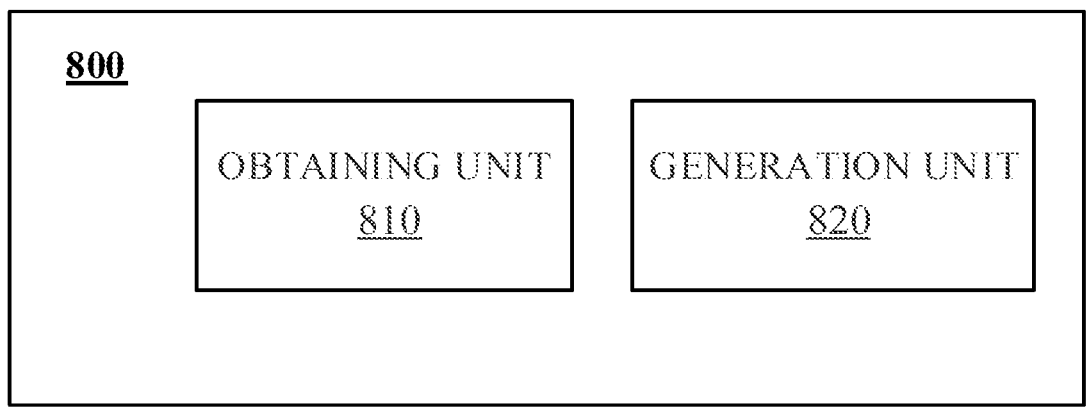
FIG. 8 illustrates an exemplary block diagram of an apparatus for a network device of SCell in accordance with some embodiments.

FIG. 8 illustrates an exemplary block diagram of an apparatus for a network device of SCell in accordance with some embodiments. The apparatus 800 illustrated in FIG. 8 may be used to implement the method 400 as illustrated in combination with FIG. 4.

As illustrated in FIG. 8, the apparatus 800 includes an obtaining unit 810 and a generation unit 820.

The obtaining unit 810 may be configured to obtain a physical random access channel (PRACH) preamble from the UE.

The generation unit 820 may be configured to generate a random access response (RAR) including the information associated with a valid TA for transmission to the UE, wherein a TA is considered to be a valid TA when the TA meets a preset criterion.

According to some embodiments of the present disclosure, by generating a RAR including the information associated with a valid TA, the network device of the target PUCCH SCell can provide a valid TA to the UE, such that no matter a valid TA is previously provided or not, the UE can obtain a valid TA during the PUCCH SCell activation from the target PUCCH SCell, thereby achieving the PUCCH SCell activation.

Figure 9:
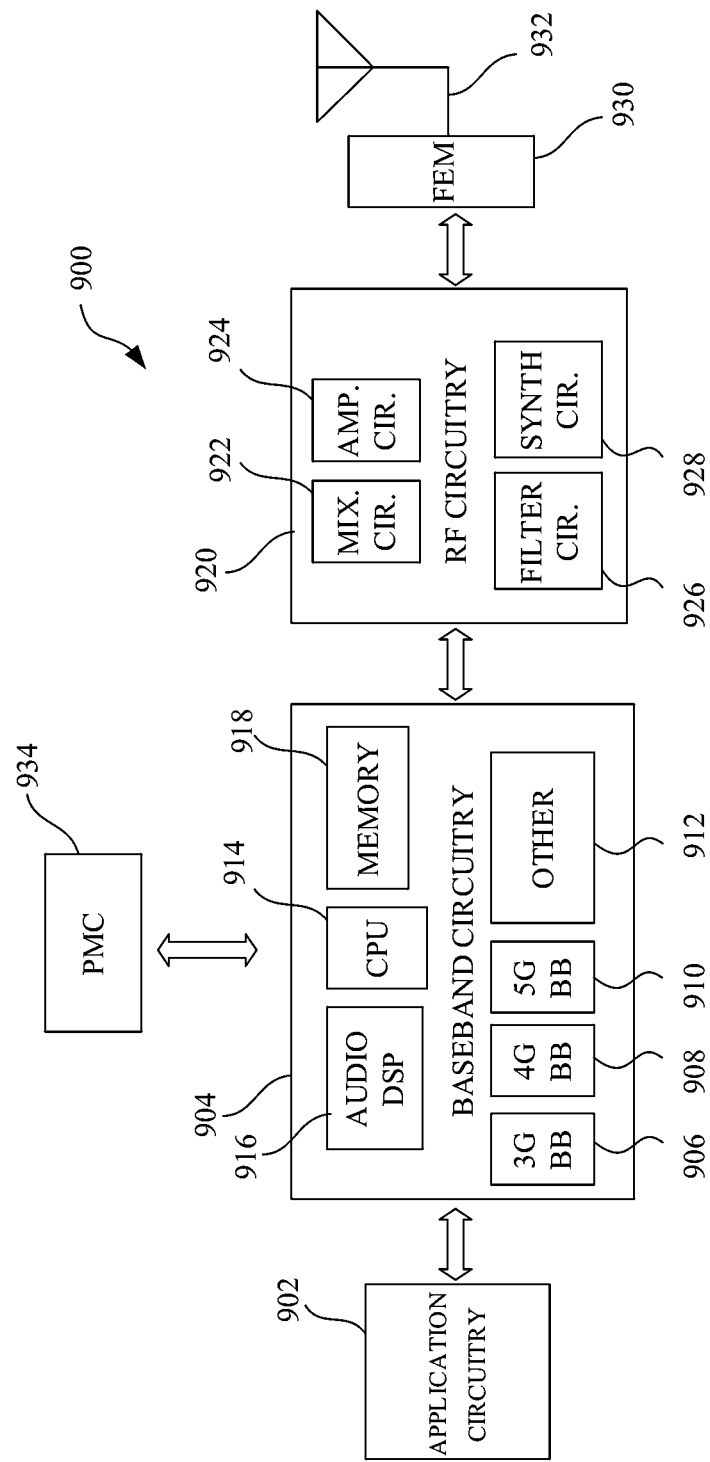
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional −N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in an EGE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
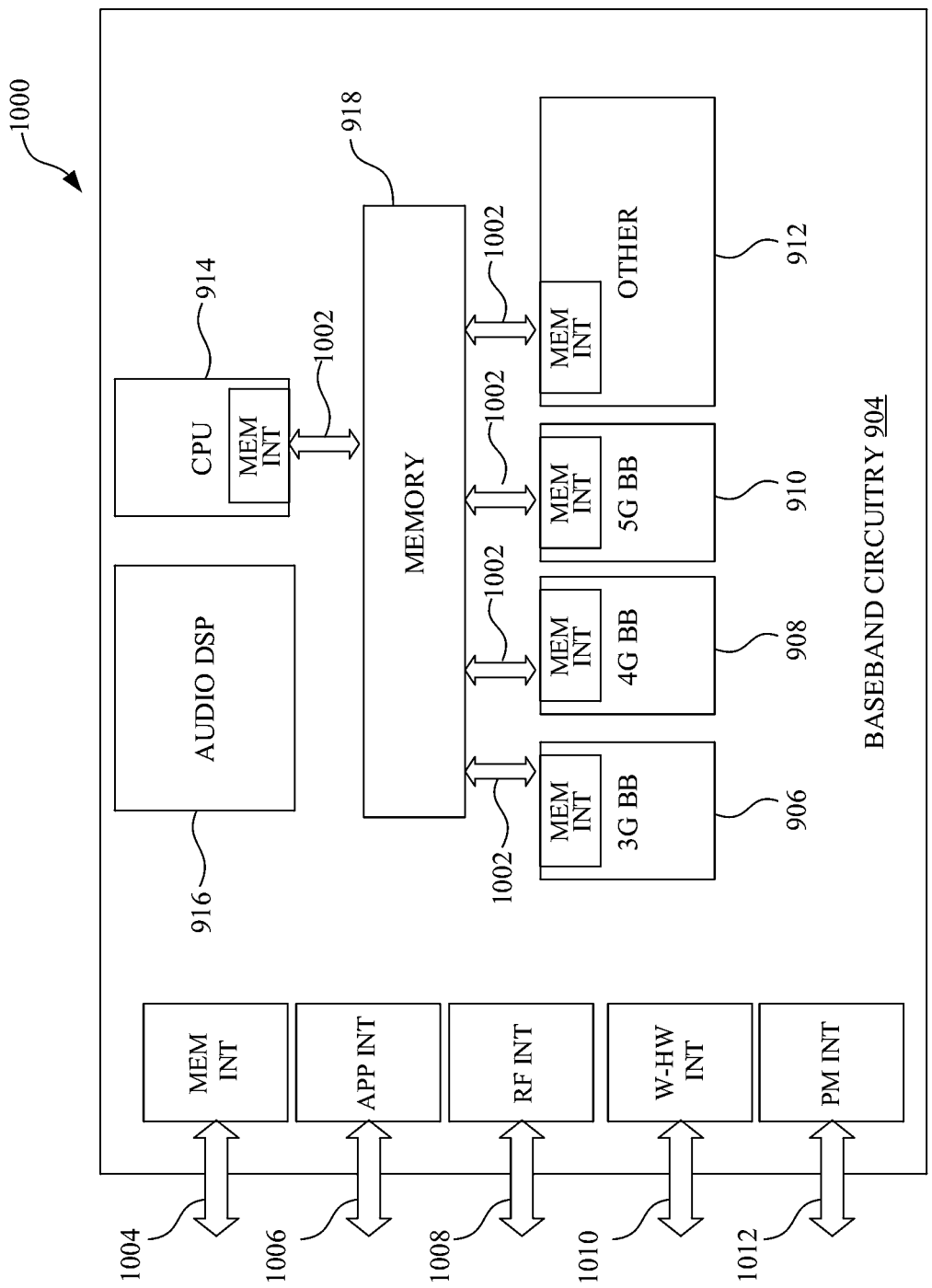
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 9 may comprise 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
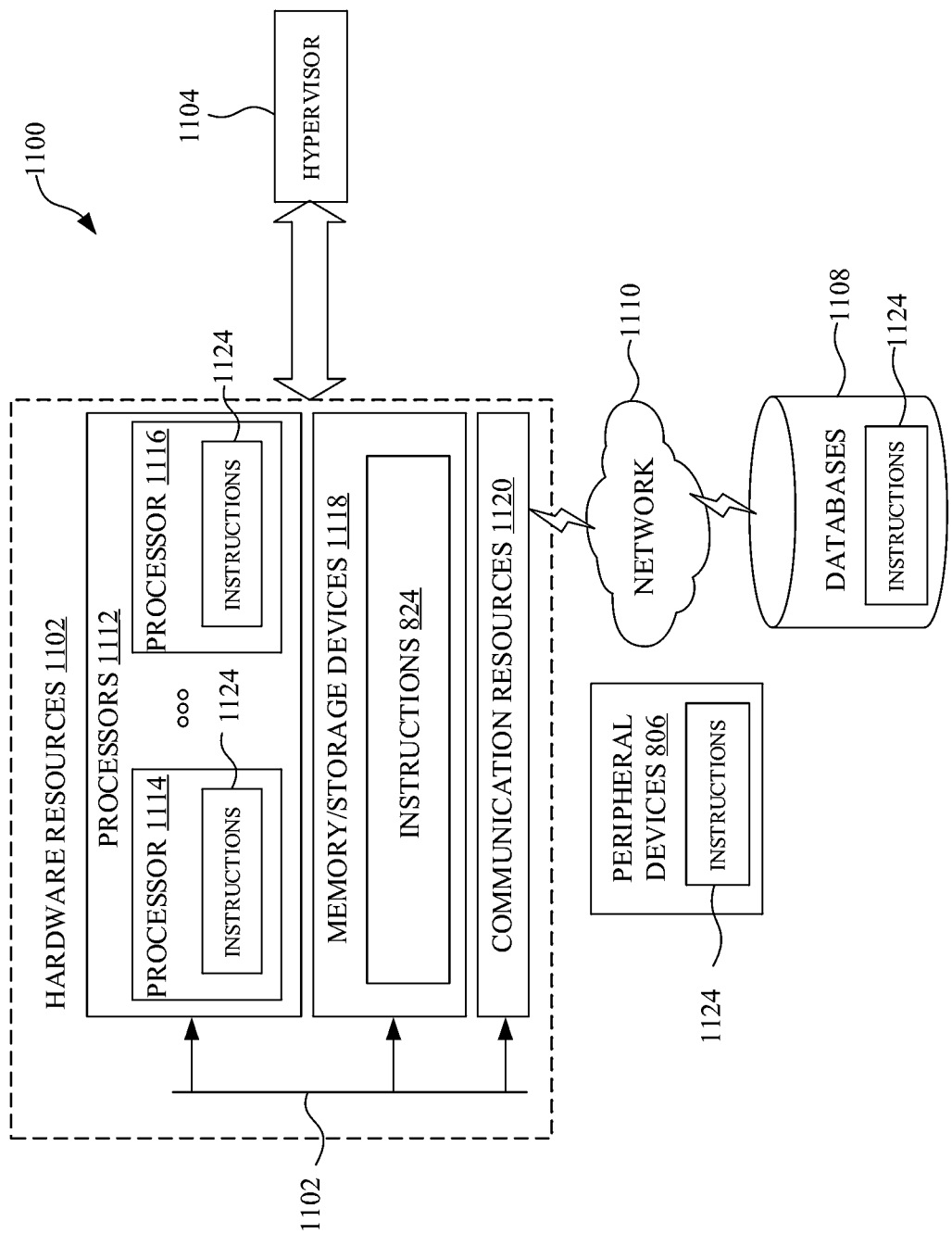
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may comprise software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
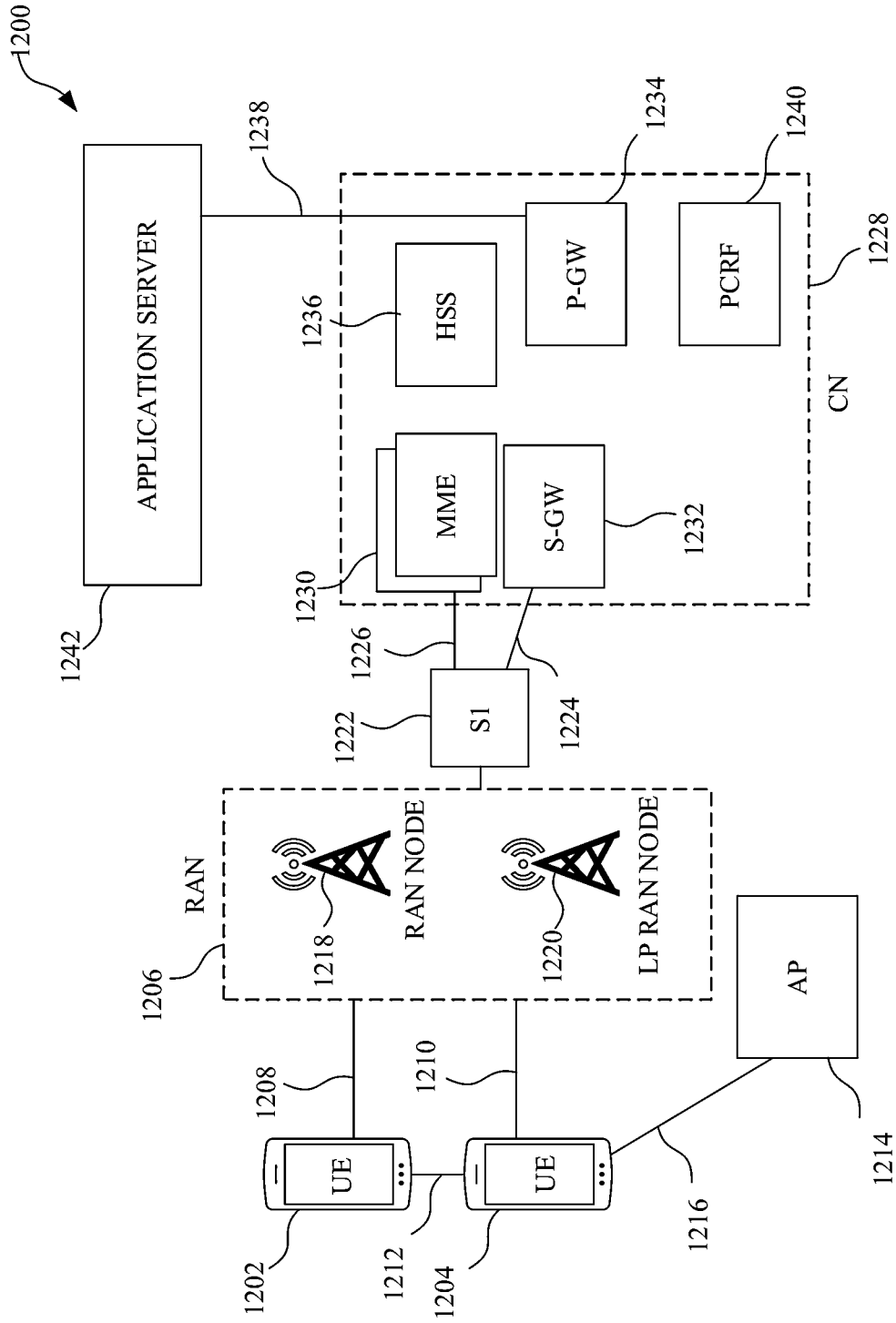
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which comprises a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1214, via connection 1216. The connection 1216 can comprise a local wireless connection, such as a connection consistent with any IEEE 802.11 protocol, wherein the AP 1214 would comprise a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the EGE 1202 and the EGE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an S1 interface 1222. In embodiments, the CN 1228 may be an evolved packet core (EPC) network, a NextGen Packet Core (NPC) network, or some other type of CN. In this embodiment the S1 interface 1222 is split into two parts: the S1-U interface 1224, which carries traffic data between the macro RAN node 1218 and the LP RAN node 1220 and a serving gateway (S-GW), shown as S-GW 1132, and an S1-mobility management entity (MME) interface, shown as S1-MME interface 1226, which is a signaling interface between the macro RAN node 1218 and LP RAN node 1220 and the MME(s) 1230.

In this embodiment, the CN 1228 comprises the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may comprise a database for network users, including subscription-related information to support the network entities' handling of communication sessions. The CN 1228 may comprise one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the S1 interface 1222 towards the RAN 1206, and routes data packets between the RAN 1206 and the CN 1228. In addition, the S-GW 1232 may be a local mobility anchor point for inter-RAN node handovers and also may provide an anchor for inter-3 GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1242 via an IP communications interface 1238. The application server 1242 can also be configured to support one or more communication services (e.g., Voice-over-Internet Protocol (VoIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QoS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), including: obtaining a physical uplink control channel (PUCCH) secondary cell (SCell) activation command from a primary cell (PCell) or primary secondary-cell-group cell (PSCell), wherein the PUCCH SCell activation command is used for an PUCCH SCell activation of a target PUCCH SCell for the UE; performing PUCCH SCell activation operations associated with a valid timing advance (TA) and the PUCCH SCell activation command, wherein a TA is considered to be a valid TA when the TA meets a preset criterion; and generating a channel state information (CSI) report for transmission to at least one of the PCell, PSCell and the target PUCCH SCell, wherein the CSI report indicates that the PUCCH SCell activation is completed.

Example 2 is the method of Example 1, wherein performing PUCCH SCell activation operations associated with the valid TA and the PUCCH SCell activation command includes: performing uplink (UL) PUCCH SCell activation operations associated with the valid TA and the PUCCH SCell activation command.

Example 3 is the method of Example 2, wherein performing UL PUCCH SCell activation operations associated with the valid TA and the PUCCH SCell activation command includes: during a first time period: monitoring a physical random access channel (PRACH) occasion for the target PUCCH SCell; and generating a PRACH preamble for transmission to the target PUCCH SCell at the PRACH occasion.

Example 4 is the method of Example 3, wherein the PRACH occasion is obtained from the PCell or PSCell during an addition of the target PUCCH SCell.

Example 5 is the method of Example 3, wherein the first time period is equal to a sum of a synchronization signal/physical broadcast channel (SS/PBCH) block to PRACH occasion association period and a predetermined time period.

Example 6 is the method of Example 3, wherein performing UL PUCCH SCell activation associated with the valid TA and the PUCCH SCell activation command further includes: during a second time period subsequent to the first time period: obtaining a first available random access response (RAR) from the SCell that includes an information associated with the valid TA.

Example 7 is the method of Example 6, wherein obtaining the first available RAR includes: obtaining a RAR from the target PUCCH SCell; and determining whether the RAR includes the information associated with the valid TA.

Example 8 is the method of Example 7, further including: in response to determining that the RAR does not include the information associated with the valid TA, waiting for a next RAR, until obtaining the first available RAR that includes the information associated with the valid TA.

Example 9 is the method of Example 7, further including: in response to determining that the RAR does not include the information associated with the valid TA, dropping the PUCCH SCell activation of the target PUCCH SCell for the UE.

Example 10 is the method of Example 6, wherein performing UL PUCCH SCell activation operations associated with the valid TA and the PUCCH SCell activation command further includes: during a third time period subsequent to the second time period: decoding the information associated with the valid TA; and applying the valid TA to a UL physical layer based on the decoded information associated with the valid TA, such that a PUCCH transmission to the target PUCCH SCell is ready to be used.

Example 11 is the method of Example 10, wherein the third time period is greater than or equal to k+1 slots, and wherein $k = \lceil N_{slot}^{subframe,\mu} \cdot (N_{T,1} + N_{T,2} + N_{TA,max} + T_0)/T_{sf} \rceil$, where $N_{T,1}$ is a time duration of $N_1$ symbols corresponding to a physical downlink shared channel (PDSCH) processing time for UE processing capability 1 when additional PDSCH demodulation reference signal (DM-RS) is configured, $N_{T,2}$ is a time duration of $N_2$ symbols corresponding to a physical uplink shared channel (PUSCH) preparation time for UE processing capability 1, $N_{TA,max}$ is a maximum timing advance value that can be provided by a TA command field of 12 bits, $N_{slot}^{subframe,\mu}$ is a number of slot per subframe, and $T_{sf}$ is a subframe duration, $T_0$ is a preset time period, and where $N_1$ and $N_2$ are determined with respect to a minimum SCS among the SCSs of all configured UL bandwidth parts (BWPs) for all uplink carriers in a timing advance group (TAG) and of all configured DL BWPs for corresponding downlink carriers.

Example 12 is the method of Example 1, wherein the preset criterion is that a parameter TimeAlignmentTimer associated with a timing advance group (TAG) containing the target PUCCH SCell is running.

Example 13 is the method of Example 2, further including: prior to performing UL PUCCH SCell activation operations associated with the valid TA and the PUCCH SCell activation command: performing downlink (DL) PUCCH SCell activation operations associated with the PUCCH SCell activation command.

Example 14 is the method of Example 13, wherein downlink DL PUCCH SCell activation operations associated with the PUCCH SCell activation command includes target PUCCH SCell synchronization, T/F tracking, AGC settling and CSI resource measurement on the target PUCCH SCell.

Example 15 is the method of Example 1, further including: after obtaining a PUCCH SCell activation command from the PCell or PSCell: generating a hybrid automatic repeat request (HARQ) signaling for transmission to the PCell or PSCell, wherein the HARQ signaling indicates that the UE has received the PUCCH SCell activation command.

Example 16 is a method for a network device of a primary cell (PCell) or primary secondary-cell-group cell (PSCell), including: generating a physical uplink control channel (PUCCH) secondary cell (SCell) activation command for transmission to a user equipment (UE), wherein the PUCCH SCell activation command is used for a PUCCH SCell activation of a target PUCCH SCell for the UE; obtaining a hybrid automatic repeat request (HARQ) signaling from the UE, wherein the HARQ signaling indicates that the UE has received the PUCCH SCell activation command; and configuring a physical downlink control channel (PDCCH) order for transmission to the UE, wherein the PDCCH order requires the UE to initiate a random access (RA) procedure on the target PUCCH SCell.

Example 17 is the method of Example 16, further including: obtaining a channel state information (CSI) report from the UE, wherein the CSI report indicates that the PUCCH SCell activation is completed.

Example 18 is the method of Example 16, wherein the network device of the PCell or PSCell does not configure, for transmission to the UE, UE activities that cause interruption during the PUCCH SCell activation of the target PUCCH SCell for the UE.

Example 19 is a method for a network device of a secondary cell (SCell), wherein the SCell is a target PUCCH SCell to be activated for a user equipment (UE), the method including: obtaining a physical random access channel (PRACH) preamble from the UE; and generating a random access response (RAR) including the information associated with a valid Timing Advance (TA) for transmission to the UE, wherein a TA is considered to be a valid TA when the TA meets a preset criterion.

Example 20 is the method of Example 19, further including: obtaining a channel state information (CSI) report from the UE, wherein the CSI report indicates that the PUCCH SCell activation is completed.

Example 21 is the method of Example 19, wherein the preset criterion is that a parameter TimeAlignmentTimer associated with a timing advance group (TAG) containing the SCell is running.

Example 22 is an apparatus for a user equipment (UE), the apparatus including: one or more processors configured to perform steps of the method according to any of Examples 1-15.

Example 23 is an apparatus of a network device for a primary cell (PCell) or primary secondary-cell-group cell (PSCell), the network device including: one or more processors configured to perform steps of the method according to any of Examples 16-18.

Example 24 is an apparatus of a network device for a secondary cell (SCell), the network device including: one or more processors configured to perform steps of the method according to any of Examples 19-21.

Example 25 is a computer readable medium having computer programs stored thereon which, when executed by one or more processors, cause an apparatus to perform steps of the method according to any of Examples 1-21.

Example 26 is an apparatus for a communication device, including means for performing steps of the method according to any of Examples 1-21.

Example 27 is a computer program product including computer programs which, when executed by one or more processors, cause an apparatus to perform steps of the method according to any of Examples 1-21.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
obtaining a physical uplink control channel (PUCCH) secondary cell (SCell) activation command from a primary cell (PCell) or primary secondary-cell-group cell (PSCell), wherein the PUCCH SCell activation command is used for an PUCCH SCell activation of a target PUCCH SCell for the UE;
performing PUCCH SCell activation operations associated with a valid timing advance (TA) and the PUCCH SCell activation command, wherein a TA is considered to be a valid TA when the TA meets a preset criterion, wherein performing the PUCCH SCell activation operations associated with the valid TA and the PUCCH SCell activation command comprises performing uplink (UL) PUCCH SCell activation operations associated with the valid TA and the PUCCH SCell activation command in a first time period, a second time period, and a third time period, wherein, the third time period is greater than or equal to k+1 slots, and wherein $k=\lceil N_{slot}^{subframe,\mu} \cdot (N_{T,1}+N_{T,2}+N_{TA,max}+T_0)/T_{sf} \rceil$, where $N_{T,1}$ is a time duration of $N_1$ symbols corresponding to a physical downlink shared channel (PDSCH) processing time for UE processing capability 1 when additional PDSCH demodulation reference signal (DM-RS) is configured, $N_{T,2}$ is a time duration of $N_2$ symbols corresponding to a physical uplink shared channel (PUSCH) preparation time for UE processing capability 1, $N_{TA,max}$ is a maximum timing advance value that is provided by a TA command field of 12 bits, $N_{slot}^{subframe,\mu}$ is a number of slot per subframe, and $T_{sf}$ is a subframe duration, $T_0$ is a preset time period, and where $N_1$ and $N_2$ are determined with respect to a minimum subcarrier spacing (SCS) among SCSs of all configured UL bandwidth parts (BWPs) for all uplink carriers in a timing advance group (TAG) and of all configured DL BWPs for corresponding downlink carriers; and generating a channel state information (CSI) report for transmission to at least one of the PCell, PSCell and the target PUCCH SCell, wherein the CSI report indicates that the PUCCH SCell activation is completed.

2. The method of claim 1, wherein performing UL PUCCH SCell activation operations associated with the valid TA and the PUCCH SCell activation command comprises:

during the first time period:
monitoring a physical random access channel (PRACH) occasion for the target PUCCH SCell; and
generating a PRACH preamble for transmission to the target PUCCH SCell at the PRACH occasion.

3. The method of claim 2, wherein the PRACH occasion is obtained from the PCell or PSCell during an addition of the target PUCCH SCell.

4. The method of claim 2, wherein the first time period is equal to a sum of a synchronization signal/physical broadcast channel (SS/PBCH) block to PRACH occasion association period and a predetermined time period.

5. The method of claim 2, wherein performing UL PUCCH SCell activation associated with the valid TA and the PUCCH SCell activation command further comprises:

during the second time period subsequent to the first time period:
obtaining a first available random access response (RAR) from the target PUCCH SCell that includes an information associated with the valid TA.

6. The method of claim 5, wherein obtaining the first available RAR comprises:
obtaining a RAR from the target PUCCH SCell; and
determining whether the RAR includes the information associated with the valid TA.

7. The method of claim 6, further comprising:
in response to determining that the RAR does not include the information associated with the valid TA, waiting for a next RAR, until obtaining the first available RAR that includes the information associated with the valid TA.

8. The method of claim 6, further comprising:
in response to determining that the RAR does not include the information associated with the valid TA, dropping the PUCCH SCell activation of the target PUCCH SCell for the UE.

9. The method of claim 5, wherein performing UL PUCCH SCell activation operations associated with the valid TA and the PUCCH SCell activation command further comprises:

during the third time period subsequent to the second time period:
decoding the information associated with the valid TA; and
applying the valid TA to a UL physical layer based on the decoded information associated with the valid TA, such that a PUCCH transmission to the target PUCCH SCell is ready to be used.

10. The method of claim 1, wherein the preset criterion is that a parameter TimeAlignmentTimer associated with a TAG containing the target PUCCH SCell is running.

11. The method of claim 1, further comprising:
prior to performing UL PUCCH SCell activation operations associated with the valid TA and the PUCCH SCell activation command:
performing downlink (DL) PUCCH SCell activation operations associated with the PUCCH SCell activation command.

12. The method of claim 11, wherein downlink DL PUCCH SCell activation operations associated with the PUCCH SCell activation command comprises target PUCCH SCell synchronization, T/F tracking, AGC settling and CSI resource measurement on the target PUCCH SCell.

13. The method of claim 1, further comprising:
after obtaining a PUCCH SCell activation command from the PCell or PSCell:
generating a hybrid automatic repeat request (HARQ) signaling for transmission to the PCell or PSCell, wherein the HARQ signaling indicates that the UE has received the PUCCH SCell activation command.

* * * * *